United States Patent [19]
Rosenau

[11] Patent Number: 5,927,322
[45] Date of Patent: Jul. 27, 1999

[54] QUANTITY REGULATING VALVE FOR CONTROLLING LIQUIDS

[75] Inventor: Bernd Rosenau, Tamm, Germany

[73] Assignee: Robert Bosch GmbH, Stuttgart, Germany

[21] Appl. No.: 09/105,167

[22] Filed: Jun. 26, 1998

[30] Foreign Application Priority Data

Jun. 30, 1997 [DE] Germany .......................... 197 27 785

[51] Int. Cl.⁶ ................................................. F16K 31/12
[52] U.S. Cl. ...................... 137/487.5; 137/522; 137/517; 137/495; 251/129.02; 123/447; 123/446
[58] Field of Search ................................... 137/522, 517, 137/495, 487.5; 251/129.02; 123/447

[56] References Cited

U.S. PATENT DOCUMENTS

| | | | |
|---|---|---|---|
| 2,245,271 | 6/1941 | Guill ........................................ | 137/517 |
| 2,376,124 | 5/1945 | Coulbourn ........................... | 137/517 X |
| 2,826,215 | 3/1958 | Wolfslau et al. ................... | 251/129.02 |
| 2,865,395 | 12/1958 | Fields ................................... | 137/495 X |
| 3,719,401 | 3/1973 | Peruglia .............................. | 137/522 X |
| 4,632,358 | 12/1986 | Orth et al. . | |
| 4,711,269 | 12/1987 | Sule ................................. | 251/129.02 X |
| 4,719,889 | 1/1988 | Amann et al. ........................... | 123/447 |
| 4,884,545 | 12/1989 | Mathis ..................................... | 123/447 |
| 5,503,364 | 4/1996 | Enomoto et al. ................... | 251/129.02 |
| 5,727,525 | 3/1998 | Tsuzuki . | |

FOREIGN PATENT DOCUMENTS

| | | |
|---|---|---|
| 595264 | 5/1994 | European Pat. Off. . |
| 840004 | 5/1998 | European Pat. Off. . |
| 4238727 | 5/1994 | Germany . |
| 4332837 | 7/1994 | Germany . |

*Primary Examiner*—Denise L. Ferensic
*Assistant Examiner*—Ramyar Farid
*Attorney, Agent, or Firm*—Edwin E. Greigg; Ronald E. Greigg

[57] ABSTRACT

A quantity regulation valve for controlling liquids in which a valve member can be moved by an electromagnet, permitting different through flow cross sections to be set so that a high pressure pump that is supplied with fuel via the quantity regulation valve can feed a variable quantity of high pressure fuel. At the same time, the valve member of the quantity regulation valve is equipped with a sealing face that cooperates with a valve seat for the purpose of absolutely preventing the high pressure fuel delivery.

20 Claims, 2 Drawing Sheets

QUANTITY REGULATING VALVE FOR CONTROLLING LIQUIDS

BACKGROUND OF THE INVENTION

The invention is based on a quantity regulating valve for delivering a desired amount of fuel. A valve of this kind has been disclosed in DE AS 1 025 693, in which a valve closing member is provided, which can be moved in a through bore and has two annular collars, each having a side oriented toward the other is embodied as a smooth sealing face. These sealing faces cooperate with flat seat faces, which define the outlet of a through bore into control chambers. Lines lead from these control chambers to pressure sources or discharge chambers. An outlet branches off centrally from the through bore and can be connected to one of the control chambers depending on the position of the valve member. This valve is thus embodied as a reversing valve and switches to either the one connection between the one control chamber and the outlet or the other connection between the other control chamber and the outlet. When the electromagnet is not excited, a compression spring closes one of the connections. The known valve is embodied so that it switches with small switching magnets at a high pressure level.

OBJECT AND SUMMARY OF THE INVENTION

The quantity regulating valve according to the invention, makes available an electrically controllable valve with which variable through flow cross sections can be set for precisely controlling the delivery quantity of fuel from a low pressure source to a high pressure pump. It is assured that even a zero delivery of fuel can be set between the low pressure source and the high pressure pump, i.e. that the connection between the low pressure source and the high pressure pump is closed in a totally sealed fashion.

In an advantageous modification in order to meter the varying through flow cross sections in the quantity regulation valve, a guiding part of the valve member of the quantity regulation valve is embodied as tapered, wherein this part of the guiding part adjoins the control edge of the through flow cross section at the valve member. In a further advantageous embodiment the through flow cross section at the valve member is defined between the control edge and a throttle opening that emerges on the jacket face of the valve member. Accordingly, it is advantageous that in order to achieve an interruption of the delivery of fuel from the low pressure source to the high pressure pump and in order to place the control edge in readiness, the seat of the valve member is embodied as conical, with a sealing face on the valve member that is conical as well. The vertex angle of the cone whose jacket face defines the sealing face on the valve member is definitely greater than the vertex angle of the cone whose jacket face describes the seat face. This produces an edge contact of the valve member with the valve seat, which assures a high degree of leak-proofness. The valve member is guided in another advantageous manner, wherein the valve member is embodied as ball-shaped at the point where the valve member joins the armature of the electromagnet.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
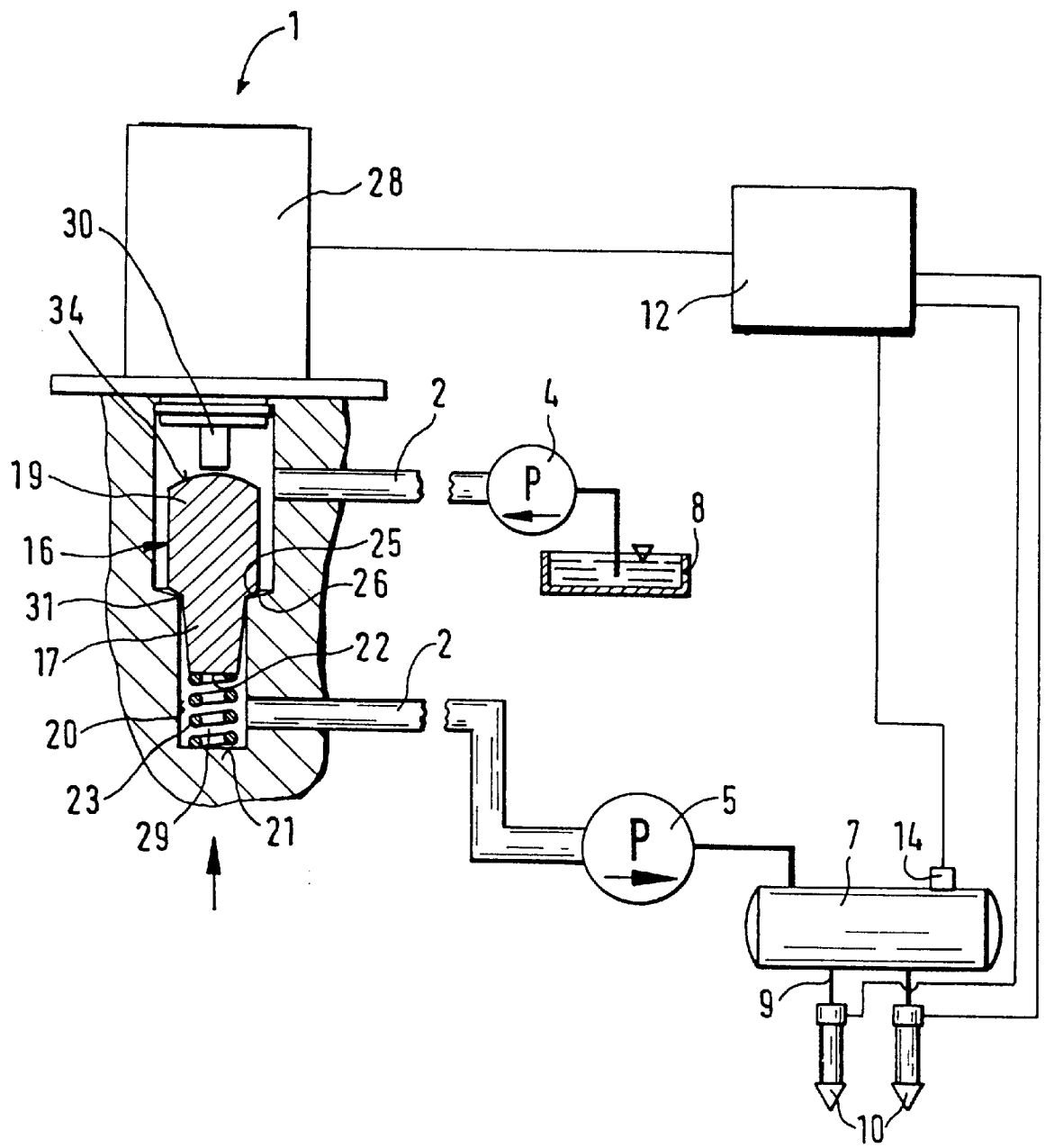
FIG. 1 is a simplified representation of the quantity regulation valve according to the invention.

According to FIG. 1, the quantity regulation valve 1 according to the invention is disposed in a connecting line 2 between a prefeed pump 4 and a high pressure pump 5. The prefeed pump 4 is used as a low pressure source for fuel, which is supplied in metered fashion to pump work chambers of the high pressure pump 5 in order to deliver particular quantities of fuel raised to a high pressure to a high pressure fuel container 7, which is connected to the pressure side of the high pressure pump 5. The prefeed pump 4 aspirates the fuel from a fuel reservoir 8. The high pressure fuel container is part of a fuel injection system and makes available fuel which has been brought to injection and via pressure lines 9, this fuel is conveyed further to fuel injection valves 10. These are electrically controlled by a control unit 12. The pressure in the high pressure fuel container 7 is also controlled with the aid of this control unit 12, by virtue of the fact that the quantity regulation valve 1 is controlled by the control unit 12 in accordance with a pressure sensor 14 which detects this pressure, the pressure in the fuel container 7. The through flow cross section at the quantity regulation valve is changed in accordance with the control signal so that the high pressure delivery quantity of the high pressure pump 5 can be varied in this manner.

The quantity regulation valve has a valve member 16, which has a conical first part 17 that is smaller in diameter, and a second part 19 that is larger in diameter. The first, smaller diameter part 17 dips into a guide bore 20 of the quantity regulation valve housing 3. This guide bore can also be called a guiding part. A compression spring 23 is clamped between the closed end 21 of the guide bore 20 and the end face 22 of the smaller diameter part 17 that is inserted into the guide bore.

The transition between the smaller diameter part 17 and the larger diameter part 19 of the valve member 16 is embodied as a conical sealing face 25, which is embodied with a correspondingly conical valve seat 26 at the transition from the guide bore to a chamber 27 that constitutes an influx side. The chamber 27 receives the larger diameter part of the valve member and is closed on the end face by an electromagnet 28. The connecting line 2 that leads from the prefeed pump 4 feeds fuel into the chamber 27. From the chamber 29, which constitutes a discharge side of the valve and is enclosed in the guide bore 20 by the end face 22 of the valve member 16, this connection line 2 continues on to the high pressure pump 5.

The electromagnet 28 has a schematically reproduced armature 30, against which the valve member 16 is moved through the action of the compression spring 23. Consequently, the position of the valve member 16 also changes in accordance with the movement of the armature 3. The electromagnet is embodied as an operating or actuating magnet, wherein the armature is displaced more or less depending on the degree of excitation. This can take place in a known manner with a variable analogue voltage or with a synchronous triggering of the electromagnet. The contact point of the valve member 16 to the armature 30 is embodied as a curved surface 34 so that upon contact of the valve member 16 with the armature, the least possible amount of lateral forces are exerted on this valve member.

During operation, depending on the excitation of the electromagnet, the armature 30 is displaced more or less and correspondingly, the valve member 16 assumes a position that is more or less distant from the valve seat 26. With full excitation of the electromagnet, the valve member 16 is pressed counter to the force of the restoring spring 23, tightly against the conical valve seat 26 so that a communication between the parts of the connecting line 2 is completely interrupted. With only partial excitation, the valve member 16 lifts up from its seat 26. An edge 31, which defines the valve seat 26 at the transition to the guide bore 20 and which functions here as a control edge, can then control through flow cross sections at the valve member 16 in such a way that as the distance of the valve member from the valve seat 26 increases, the through flow cross section at the valve member is opened further. For this purpose, the smaller diameter part 17 of the valve member is embodied as slightly conical in the region of the guide bore 20, as can be inferred from FIG. 1 and still more precisely from the detail in FIG. 2. As the valve member lifts up from the valve seat 26, an annular cross section 33 is consequently produced between the annular edge 31 and the jacket face of the conical, smaller diameter part 17 of the valve member. With increasing distance from the valve seat, this annular face and therefore the through flow cross section for fuel from the low pressure pump 4 to the high pressure pump 5 increases in size. Consequently, the high pressure delivery quantity of the high pressure pump is varied in accordance with the control by means of the control unit 12.

Figure 2:
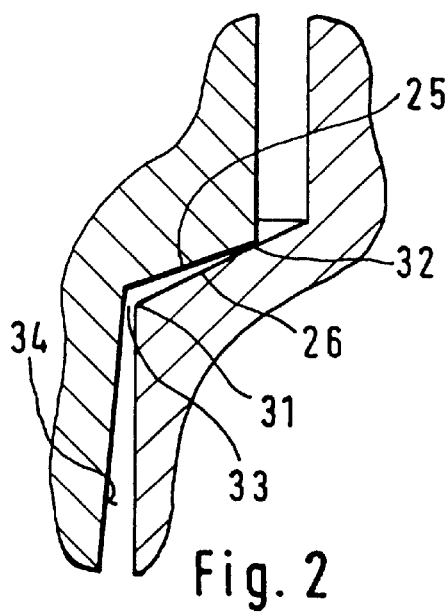
FIG. 2 shows a first embodiment of the valve member sealing face with regard to the valve seat and the embodiment for changing the through flow cross sections at the valve member.

In FIG. 2, the part of the quantity regulation valve 1 with the sealing face 25 and the valve seat 26 is shown in an enlarged partial view. It is clear in this instance that the sealing face 25 and valve seat, respectively, are surfaces that are part of a cone jacket, wherein the vertex angle of the cone that describes the sealing face 25 is greater than the vertex angle of the jacket of the cone surface, which describes the valve seat 26. Consequently, it turns out that a sealing edge 32 on the outer circumference of the larger diameter part 19 of the valve member 16 comes into contact with the valve seat. When this sealing edge lifts up from the valve seat 26, a through flow cross section 33 that can be immediately realized is available between the edge 31 of the valve seat 26 and the jacket face 34 of the smaller diameter part 17 of the valve member. The through flow cross section is an annular face which increases in size as the stroke of the valve member increases.

Figure 3:
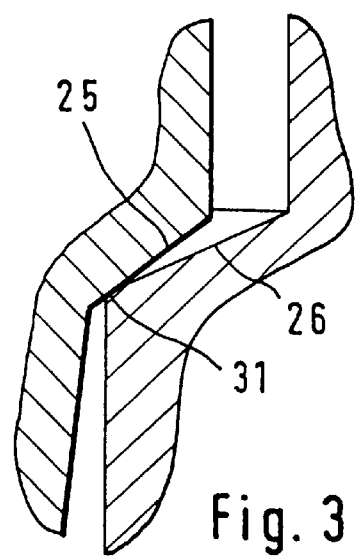
FIG. 3 shows a second embodiment of the valve member sealing face with regard to the valve seat.

FIG. 3 shows a variant of the exemplary embodiment according to FIG. 2, wherein the edge 31 of the valve seat 26 is also simultaneously the sealing edge which the sealing face 25 comes into contact with in the closed position of the valve member 16, and this variant is realized by means of a vertex angle correspondingly selected in a different manner.

Figure 4:
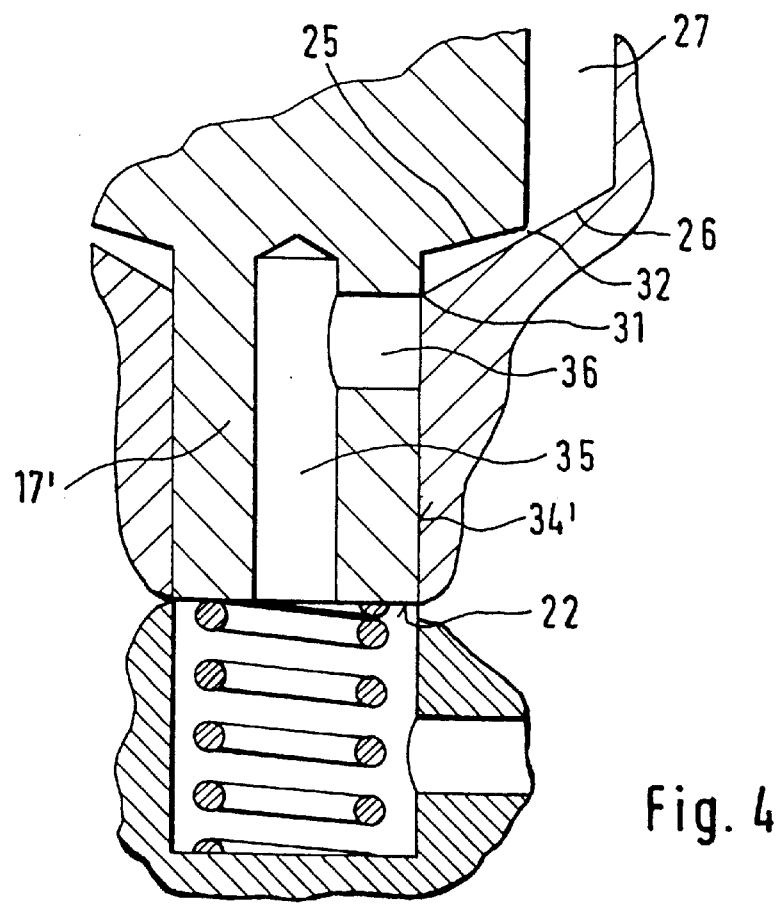
FIG. 4 shows a third embodiment of the invention, with a modified embodiment of the through flow cross sections at the valve member.

In a fourth embodiment according to FIG. 4, a blind bore 35 leading from the end face 22 is provided in the smaller diameter part 17' of the valve member and a throttle conduit 36 leads from this blind bore 35 to the jacket face 34' of the smaller diameter part 17' of the valve member. The mouth of this throttle conduit is disposed immediately adjoining the sealing face 25 of the valve member so that as the stroke of the valve member begins, the control edge 31 on the valve seat 26 begins to open the communication between the outlet of the throttle conduit 36 and the chamber 27. The outlet face of the throttle conduit can be rectangular so that an outlet cross section to be exactly associated with the stroke of the valve member is embodied to cooperate with the control edge 31. In this embodiment as well, it is advantageous if the vertex cone angle that defines the sealing face 25 is greater than the vertex cone angle which defines the face of the valve seat 26. In this manner, the edge 31 can be exactly associated geometrically with the outlet of the throttle conduit 36, wherein the outer sealing edge 32 takes on the task of the sealing function in the closed position of the valve member.

In this embodiment according to FIG. 4, the smaller diameter part 17' is cylindrical and is guided in the guide bore, which is likewise embodied as cylindrical. In the embodiments according to FIGS. 1 to 3, guide elements can be provided on the smaller diameter part 17 and/or on the larger diameter part 19 of the valve member and precise through flow conditions can be obtained with the aid of these guide elements. This results in reproducible, constant through flow conditions. Guides of this kind are provided, for example, with fins, which protrude radially from the valve member and come into contact with the bore walls.

Embodying a quantity regulation valve in this manner assures that a fuel delivery from the low pressure pump 4 to the high pressure pump 5 can be reliably prevented. This is particularly important with the use of the high pressure pump to supply a high pressure fuel container 7 from which fuel is withdrawn for injection by means of injection valves 10. Consequently, a quantity regulation valve of this kind can, if necessary, also reliably prevent a fuel injection in an internal combustion engine.

The foregoing relates to preferred exemplary embodiments of the invention, it being understood that other variants and embodiments thereof are possible within the spirit and scope of the invention, the latter being defined by the appended claims.

I claim:

1. A quantity regulation valve for controlling liquids, comprising a valve housing, a valve member in said valve housing, a low pressure fuel source connected to an inlet of said valve housing, a high pressure pump connected to a fuel outlet of said valve housing for delivering fuel from said high pressure pump (5), said high pressure pump supplies fuel to a high pressure fuel chamber (7) of a fuel injection system for an internal combustion engine, a pressure sensor for measuring fuel pressure in said fuel chamber, an electromagnet secured to said housing, said electromagnetic having an armature which selectively engages said valve member (16) for moving said valve member in said housing in response to the measured fuel pressure in said fuel chamber, said valve member having first and second ends, a first smaller diameter part extending from said first end and a second, larger diameter part (19) extending from said second end, a sealing face (25) is embodied at a transition from said smaller diameter part to said larger diameter part, said sealing face cooperates with a valve seat (26) on the valve housing (3), and the smaller diameter part (17) of said valve member in guided in a guide region (20) of said valve housing, said guide region of said valve housing is connected to a discharge side (33) that leads from the sealing face (25), and the larger diameter part of said valve member (16) is disposed in an influx chamber (27) in an enlarged inner diameter part of the valve housing that is enlarged in relation to the guide region, a restoring spring (23) for biasing the valve member open, the valve member (16) is moved by the electromagnet (28) into a sealed contact with the valve seat (26) counter to a force of said restoring spring (23), the quantity regulation valve (1) controls a delivery of fuel from said low pressure source (8) to said high pressure pump (5), and said high pressure pump supplies fuel to said high pressure fuel chamber (7) of said fuel injection system for internal combustion engines, and the valve seat includes an edge that is defined toward a side of the guide region (20) and serves as a control edge (31), which in a stroke of the valve member (16), with increasing distance of the valve member sealing face (25) from the valve seat (26), the valve member opens up an increasing distance cross section with through flow cross sections (33, 36) at the valve member (16).

2. A quantity regulation valve according to claim 1, in which the discharge cross section, of the smaller diameter part (17) is embodied as tapering away from the sealing face (25) and the guiding part (20) is embodied as a cylindrical guide bore.

3. A quantity regulation valve according to claim 1, in which the smaller diameter part (17) has a blind bore (35) that leads from an end face (22) of said first end and from which a throttle conduit (36) branches, said throttle conduit extends crosswise to said blind bore and feeds to a jacket face (34) of the smaller diameter part (17), adjacent to the sealing face (25).

4. A quantity regulation valve according to claim 2, in which the smaller diameter part (17) has a blind bore (35) that leads from an end face (22) of said first end and from which a throttle conduit (36) branches, said throttle conduit extends crosswise to said blind bore and feeds to a jacket face (34) of the smaller diameter part (17), adjacent to the sealing face (25).

5. A quantity regulation valve according to claim 2, in which the sealing face (25) and the valve seat (26) are embodied as conical.

6. A quantity regulation valve according to claim 3, in which the sealing face (25) and the valve seat (26) are embodied as conical.

7. A quantity regulation valve according to claim 4, in which the sealing face (25) and the valve seat (26) are embodied as conical.

8. A quantity regulation valve according to claim 1, in which the larger diameter part (19) of the valve, member (16) is embodied as curved on an end face of said second end in a contact region with said armature (30) of the electromagnet (28).

9. A quantity regulation valve according to claim 2, in which the larger diameter part (19) of the valve member (16) is embodied as curved on an end face of said second end in a contact region with said armature (30) of the electromagnet (28).

10. A quantity regulation valve according to claim 3, in which the larger diameter part (19) of the valve member (16) is embodied as curved on an end face of said second end in a contact region with said armature (30) of the electromagnet (28).

11. A quantity regulation valve according to claim 5, in which the larger diameter part (19) of the valve member (16) is embodied as curved on an end face of said second end in a contact region with said armature (30) of the electromagnet (28).

12. A quantity regulation valve according to claim 8, in which the larger diameter part (19) of the valve member (16) is embodied as curved on an end face of said second end in a contact region with said armature (30) of the electromagnet (28).

13. A quantity regulation valve according to claim 1, in which the restoring spring (23) is a compression spring that engages an end face (22) of the smaller diameter part of said valve member (16).

14. A quantity regulation valve according to claim 2, in which the restoring spring (23) is a compression spring that engages an end face (22) of the smaller diameter part of said valve member (16).

15. A quantity regulation valve according to claim 3, in which the restoring spring (23) is a compression spring that engages an end face (22) of the smaller diameter part of said valve member (16).

16. A quantity regulation valve according to claim 4, in which the restoring spring (23) is a compression spring that engages an end face (22) of the smaller diameter part of said valve member (16).

17. A quantity regulation valve according to claim 5, in which the restoring spring (23) is a compression spring that engages an end face (22) of the smaller diameter part of said valve member (16).

18. A quantity regulation valve according to claim 6, in which the restoring spring (23) is a compression spring that engages an end face (22) of the smaller diameter part of said valve member (16).

19. A quantity regulation valve according to claim 7, in which the restoring spring (23) is a compression spring that engages an end face (22) of the smaller diameter part of said valve member (16).

20. A quantity regulation valve according to claim 8, in which the restoring spring (23) is a compression spring that engages an end face (22) of the smaller diameter part of said valve member (16).

* * * * *